United States Patent
Nielsen et al.

(10) Patent No.: US 8,320,672 B2
(45) Date of Patent: Nov. 27, 2012

(54) IMAGE PROCESSING APPARATUS, IMAGE PROCESSING METHOD, AND COMPUTER PROGRAM

(75) Inventors: Frank Nielsen, Tokyo (JP); Yuichi Hasegawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 867 days.

(21) Appl. No.: 11/633,032

(22) Filed: Dec. 4, 2006

(65) Prior Publication Data

US 2007/0133900 A1   Jun. 14, 2007

(30) Foreign Application Priority Data

Dec. 8, 2005   (JP) ................ P2005-355006

(51) Int. Cl.
G06K 9/34 (2006.01)
G06K 9/36 (2006.01)

(52) U.S. Cl. ........... 382/173; 382/286

(58) Field of Classification Search .......... 382/173, 382/180, 286
See application file for complete search history.

(56) References Cited

U.S. PATENT DOCUMENTS

| | | | | |
|---|---|---|---|---|
| 4,951,140 A * | 8/1990 | Ueno et al. | ............... | 348/413.1 |
| 5,128,711 A * | 7/1992 | Terashita et al. | ............... | 355/41 |
| 2002/0191861 A1* | 12/2002 | Cheatle | ............... | 382/282 |
| 2004/0081355 A1* | 4/2004 | Takahashi | ............... | 382/165 |
| 2005/0179780 A1* | 8/2005 | Kikkawa et al. | ............... | 348/207.99 |
| 2006/0204120 A1* | 9/2006 | Poon et al. | ............... | 382/254 |
| 2009/0175543 A1 | 7/2009 | Nielsen | | |

FOREIGN PATENT DOCUMENTS

| | | |
|---|---|---|
| JP | 08-262519 | 10/1996 |
| JP | 09-033986 | 2/1997 |
| JP | 2004-520735 | 12/2001 |
| JP | 2004-072655 | 3/2004 |
| JP | 2004-112596 | 4/2004 |
| JP | 2004-228994 | 8/2004 |
| WO | WO 02/052835 | 7/2002 |
| WO | WO 2003/019475 | 3/2003 |
| WO | WO 2006/132194 A1 | 12/2006 |

OTHER PUBLICATIONS

Nielsen et al., "Interactive Point-and-Click Segmentation for Object Removal in Digital Images," published Oct. 2005, pp. 131-140.*
Felzenszwalb et al., "Efficient Graph-based Image Segmentation", IJCV, vol. 59, No. 2, 2004.*
Khajahpour et al., "Hierarchical Image Segmentation Using Ant Colony and Chemical Computing Approach", Advances in Natural Computation, vol. 3611, pp. 1250-1258, 2005.*
Tanaka, Shoji et al., "An Attractiveness Evaluation Model Based on the Physical Features of Image Regions," A vol. J83-A, No. 5, pp. 576-588, May 2000.

* cited by examiner

Primary Examiner — Anand Bhatnagar
Assistant Examiner — Soo Park
(74) Attorney, Agent, or Firm — Finnegan, Henderson, Farabow, Garrett & Dunner LLP

(57) ABSTRACT

An image processing apparatus automatically determining a composition of an image includes area dividing means for dividing an input image into areas; target area determining means for determining a target area having higher visibility from the divided image; unnecessary area determining means for determining an unnecessary area having lower visibility from the divided image; and composition determining means for determining from the input image a composition that includes the target area and does not include the unnecessary area.

30 Claims, 15 Drawing Sheets

— Boundary edge
— Interior edge

IMAGE PROCESSING APPARATUS, IMAGE PROCESSING METHOD, AND COMPUTER PROGRAM

CROSS REFERENCES TO RELATED APPLICATIONS

The present invention contains subject matter related to Japanese Patent Application JP 2005-355006 filed in the Japanese Patent Office on Dec. 8, 2005, the entire contents of which are incorporated herein by reference.

BACKGROUND OF THE INVENTION

1. Field of the Invention

The present invention relates to image processing apparatuses, image processing methods, and computer programs which process images captured by, for example, digital cameras or input by other image inputting apparatuses and, more particularly, to an image processing apparatus, an image processing method, and a computer program which automate at least part of camerawork by image processing.

Specifically, the present invention relates to an image processing apparatus, an image processing method, and a computer program which automatically determine a composition of an input image and, more particularly, to an image processing apparatus, an image processing method, and a computer program which automatically determine a composition of an input image on the basis of an area where a target object, such as a person, is shown.

2. Description of the Related Art

Cameras have a long history as means for recording visual information. In recent years, digital cameras digitizing captured images are in wide spread use instead of film cameras making exposures by using films or sensitive plates. Digital cameras store digitized images in memories and transfer the stored images to personal computers or others, which perform image processing to the transferred images and store and manage the processed images, display the images in large displays, print out the images to edit albums including the images, or paste the images as part of documents. The digital cameras have the advantages in that there is no need to develop the captured image in order to look at the image and that there is no problem of the life of films because the digital cameras do not use the films.

Basically, digital cameras have approximately the same camerawork as film cameras. A photographer focuses a film camera on a subject, adjusts the aperture or the amount of exposure, performs framing so as to form an appropriate composition including the subject, and presses the shutter of the film camera. In order to suppress camera shaking, the photographer should hold the camera steady or mount the camera to a tripod.

Such camerawork has been advanced in its automation technologies and, therefore, even an inexperienced user is unlikely to fail in shooting. For example, the automation technologies include automatic focusing, automatic exposure, camera shaking correction, and automatic shuttering. However, the assignee supposes that the automation is not sufficiently realized in terms of the framing or determination of a composition of an image that is captured.

For example, Japanese Unexamined Patent Application Publication No. 8-262519 discloses a camera with an automatic framing function. The camera automatically sets a composition in which the gazing point (subject) of a photographer is positioned in the center of an image to prevent failure in the shooting, such as part of the subject that is dropped out from the image.

Japanese Unexamined Patent Application Publication No. 9-33986 discloses a camera which is provided with rectangular display means for framing, including the framing reference point, on the optical path of a subject so that a user can easily set a composition of an image of the subject.

In actual shooting scenes, there may be cases in which obstacles intervene between a subject and a photographer. In such cases, it is necessary to determine a composition so as to include only the subject in a frame. Particularly, if such obstacles are moving, it is difficult to include the subject in the frame and to release the shutter at the right moment while avoiding the obstacles. In addition, there may be cases in which an out-of-focus image of an unnecessary object, such as a finger of a user or a strap mounted to the main body of the camera, is shown in a picture to ruin the picture although the subject is included in the frame. It is not possible to completely remove such obstacles by a method of determining a composition on the basis of the subject. Accordingly, such obstacles are likely not to be found before displaying the image and, thus, it is not possible to take a photo-opportunity again.

For example, when a user attempts to shoot desired subjects with a digital camera, the subjects that are obstructed by shadows of persons in front of the user can be recognized through the view finder of the digital camera, as shown in FIG. 14. In such a case, it is desirable that a maximum rectangular area that does not include unnecessary areas, such as shadows of persons, and that has a predetermined aspect ratio is determined to be the composition, as shown in FIG. 15. However, the user has no choice but to manually perform this complicated determination.

SUMMARY OF THE INVENTION

It is desirable to provide excellent image processing apparatus, image processing method, and computer program which are capable of automating at least part of camerawork by image processing.

It is also desirable to provide excellent image processing apparatus, image processing method, and computer program which are capable of automatically determining a composition of an input image.

It is further desirable to provide excellent image processing apparatus, image processing method, and computer program which are capable of automatically determining a composition of an input image on the basis of an area where the a target object, such as a person, is shown.

It is further desirable to provide excellent image processing apparatus, image processing method, and computer program which are capable of preferably determining a composition in which an unnecessary area, such as an obstacle, is removed from the original image to extract a target area.

According to an embodiment of the present invention, an image processing apparatus automatically determining a composition of an image includes area dividing means for dividing an input image into areas; target area determining means for determining a target area having higher visibility from the divided image; unnecessary area determining means for determining an unnecessary area having lower visibility from the divided image; and composition determining means for determining from the input image a composition that includes the target area and does not include the unnecessary area.

Camerawork has been advanced in its automation technologies and, therefore, even an inexperienced user is unlikely to fail in shooting. However, framing, that is, determination of a composition of an image captured by a camera is not sufficiently automated. For example, when obstacles intervene between a subject and a photographer, it is necessary to determine a composition so as to include only the subject in a frame.

In contrast, the image processing apparatus according to the embodiment of the present invention determines a target area having higher visibility in a captured image and an unnecessary area having lower visibility in the captured image to automatically determine a composition that includes the target area and does not include the unnecessary area. Accordingly, it is possible to extract a frame that does not include unnecessary objects, including a person in front of a subject and/or a finger of a user or a strap hung over the lens of the camera, from the captured image.

The target area determining means may perform face detection to the input image to determine the target area on the basis of an area where a face is detected.

The target area determining means may perform matching between the input image and the information concerning the target object to determine an area having a higher degree of matching to be the target area.

The target area determining means may determine an area having higher attractiveness to be the target area. The attractiveness is evaluated from a physical characteristic, such as a color, shape, area (the ratio in area of each object to the input image), or texture, of each object included in the input image.

The target area and the unnecessary area can be determined through basic camerawork focusing on a subject for shooting. The target area determining means and the unnecessary area determining means may determine the target area and the unnecessary area, respectively, on the basis of a degree of focusing yielded for every area.

In this case, an edge of each divided image area in the input image may be extracted and a sum of pixel values in the edge image may be calculated for every divided image area to yield an amount of edge resulting from normalization of the sum of the pixel values with a length or an area of the edge as a value indicating a degree of focusing. The unnecessary area determining means may determine a peripheral area having a smaller amount of edge in the input image to be the unnecessary area.

Instead of automatically determining the target area and the unnecessary area from the image areas in the manner described above, at least one of the target area and the unnecessary area may be determined in accordance with the manual selection by the user with the user input means after the area division.

The area dividing means integrates polygonal meshes each including a pixel or multiple pixels by so-called mesh segmentation to extract the image areas. The mesh segmentation is basically based on the similarity between adjacent image areas. According to the embodiment of the present invention, image areas are generated at a desired density on the basis of determination of whether adjacent image areas are to be integrated by using a statistical algorithm.

The integration of the image areas on the basis of the statistical algorithm can be performed at high speed because the integration is performed by simple calculation in which the areas of polygons are statistically processed. For example, a common computational machine, such as a personal computer, can be used to process about a million polygons per second. In addition, adjustment of the value of the parameter included in a predicate allows a criterion for integrating the image areas to be appropriately set to generate polygonal meshes at a desired density, thus providing scalability.

The integration of the image areas on the basis of the statistical algorithm can be performed at high speed because the integration is performed by simple calculation in which the areas of polygons are statistically processed. Accordingly, the area division can be performed to the image areas also in a portable device, such as a digital camera, whose computing power is restricted and it is possible to realize the automatic framing for the image after the area division.

According to another embodiment of the present invention, an image processing method automatically determining a composition of an image includes the steps of dividing an input image into areas; determining a target area having higher visibility from the divided image; determining an unnecessary area having lower visibility from the divided image; and determining from the input image a composition that includes the target area and does not include the unnecessary area.

According to another embodiment of the present invention, a computer-readable program causing a computer system to execute a process of automatically determining a composition of an image includes the steps of dividing an input image into areas; determining a target area having higher visibility from the divided image; determining an unnecessary area having lower visibility from the divided image; and determining from the input image a composition that includes the target area and does not include the unnecessary area.

The computer-readable program according to this embodiment of the present invention is described in a computer-readable form so as to realize predetermined processing on the computer system. In other words, installing the computer-readable program according to this embodiment of the present invention in the computer system causes the computer system to perform a cooperative function to provide advantages similar to those of the image processing apparatus according to the embodiment of the present invention.

According to the present invention, it is possible to provide excellent image processing apparatus, image processing method, and computer program which are capable of automatically determining a composition of an input image on the basis of an area where a target object, such as a person, is shown.

According to the present invention, it is also possible to provide excellent image processing apparatus, image processing method, and computer program which are capable of preferably determining a composition in which an unnecessary area, such as an obstacle, is removed from the original image to extract a target area.

Further features and advantages of the present invention will become apparent from the following description of exemplary embodiments with reference to the attached drawings.

DESCRIPTION OF THE PREFERRED EMBODIMENTS

Embodiments of the present invention will now be described with reference to the attached drawings.

The present invention relates to an image processing apparatus that receives an image captured by, for example, a digital camera and automatically determines a composition of the captured image. The image processing apparatus automatically determines a composition of an input image on the basis of an area where a target object, such as a person, is shown. Functions of such an image processing apparatus can be installed in a personal computer that stores and manages images captured by a digital camera or in the digital camera.

Figure 1:
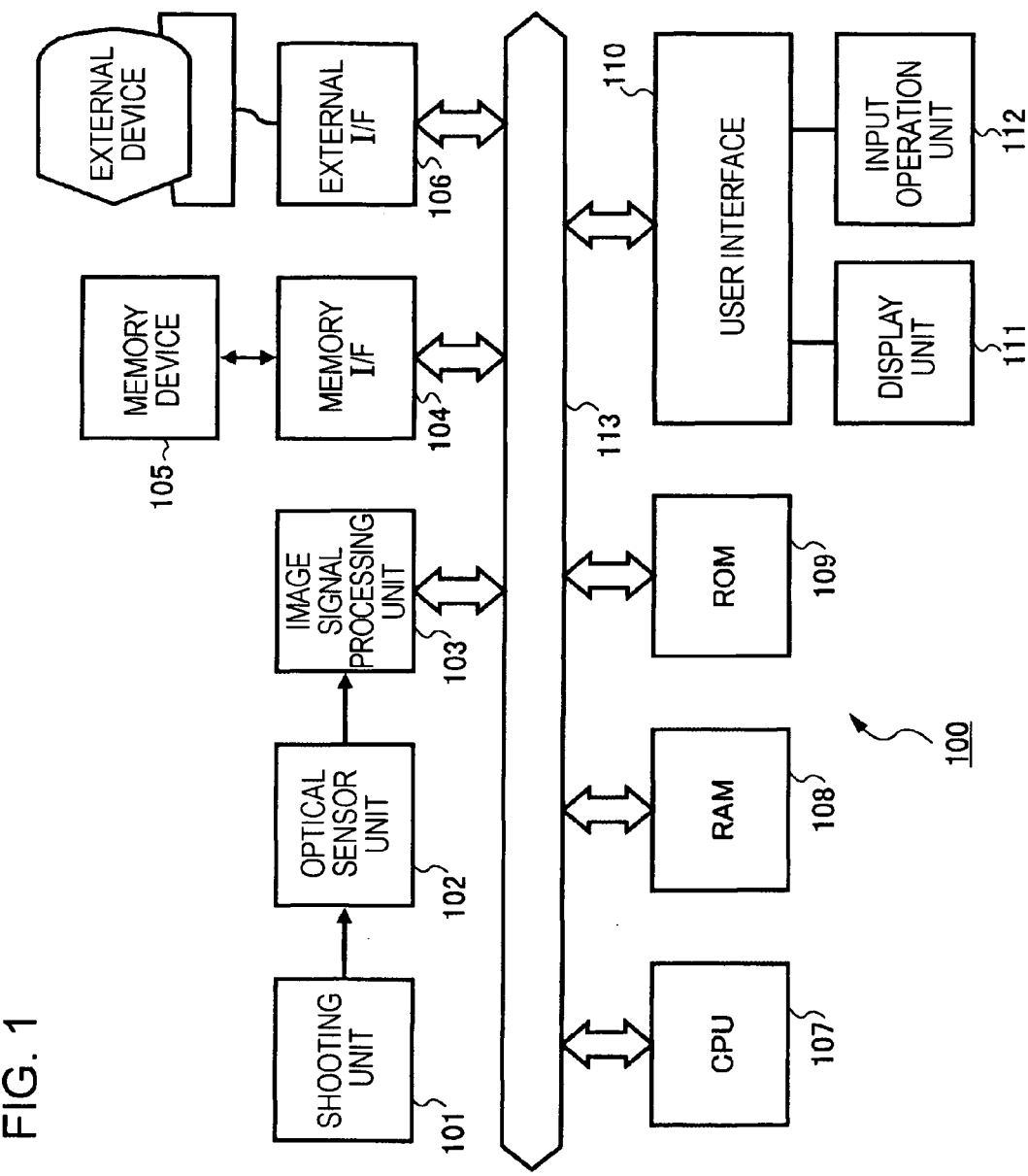
FIG. 1 is a is a block diagram schematically showing an example of the hardware structure of a digital camera having functions of an image processing apparatus according to an embodiment of the present invention.

FIG. 1 is a block diagram schematically showing an example of the hardware structure of a digital camera 100 having the functions of the image processing apparatus according to an embodiment of the present invention. Circuit components in the digital camera 100 are connected to each other via a bus 113 and perform encoding, storage, and output of captured images under the control of a CPU 107. The circuit components will now be described in detail.

A shooting unit 101 includes a shooting lens also used in each film camera. An optical sensor unit 102 includes a sensor element array, such as a charge coupled device (CCD) or a metal oxide semiconductor (MOS), and a drive circuit for the elements and is provided on the image forming surface of the shooting lens. The optical sensor unit 102 converts incident light into an electrical signal corresponding to the light intensity for every pixel.

Although not shown in FIG. 1, the optical sensor unit 102 also includes an aperture that adjusts the amount of exposure in accordance with the luminosity of light in the shooting by the shooting unit 101 and a flash unit used in the shooting at night or in a dark place.

An image signal processing unit 103 digitizes the image signal output from the optical sensor unit 102 to generate a digital image. The generated digital image is stored in a cartridge memory device 105 connected to the bus 113 via a memory interface 104. The memory device 105 is a non-volatile memory, such as an electronically erasable and programmable read only memory (EEPROM). Although image compression/decompression and other encoding/decoding processes are performed when an image is written in the memory device 105 or when an image read out from the memory device 105 is displayed, a description of the processes is omitted herein because the processes do not directly relate to the present invention.

An external interface 106 is provided with a serial output terminal conforming to, for example, USB or IEEE 1394. An image file stored in the memory device 105 is transferred to an external device, such as a personal computer, through the serial output terminal. The external interface 106 is also provided with a video output terminal through which the digital image is supplied as a video signal to a television monitor or the like where the video signal is displayed.

The digital camera 100 includes a display unit 111 and an input operation unit 112 serving as a user interface 110. The display unit 111 is, for example, a liquid crystal display and also serves as a finder. The display unit 111 displays an image read out from the memory device 105 and presents an operational screen with which shooting conditions are set. The input operation unit 112 includes a mechanical operation unit including a shutter and a zooming adjustment knob and a touch panel superposed on the display screen of the display unit 111.

The CPU 107 performs predetermined processes in accordance with program code stored in a read only memory (ROM) 109 to control the operation of the entire digital camera 100. The CPU 107 temporarily writes system variables and environmental variables used for the processes in a random access memory (RAM) 108. The processes performed by the CPU 107 include camerawork automation processes including automatic focusing, automatic exposure, and automatic framing, in addition to basic operations including the shooting operation by the digital camera 100, the display of a captured image in the liquid crystal display, and the external output of image data stored in the memory device 105.

The camerawork has been advanced in its automation technologies and, therefore, even an inexperienced user is unlikely to fail in shooting. The digital camera 100 according to the embodiment of the present invention is characterized in the automatic framing, that is, is characterized by automatically determining a composition of a captured image. Specifically, the digital camera 100 according to the embodiment of the present invention determines a target area having higher visibility in a captured image and an unnecessary area having lower visibility in the captured image to automatically determine a composition that includes the target area and does not include the unnecessary area. Accordingly, it is possible to extract a frame that does not include unnecessary objects, including a person in front of a subject and/or a finger of a user or a strap hung over the lens of the digital camera 100, from the captured image.

Figure 2:
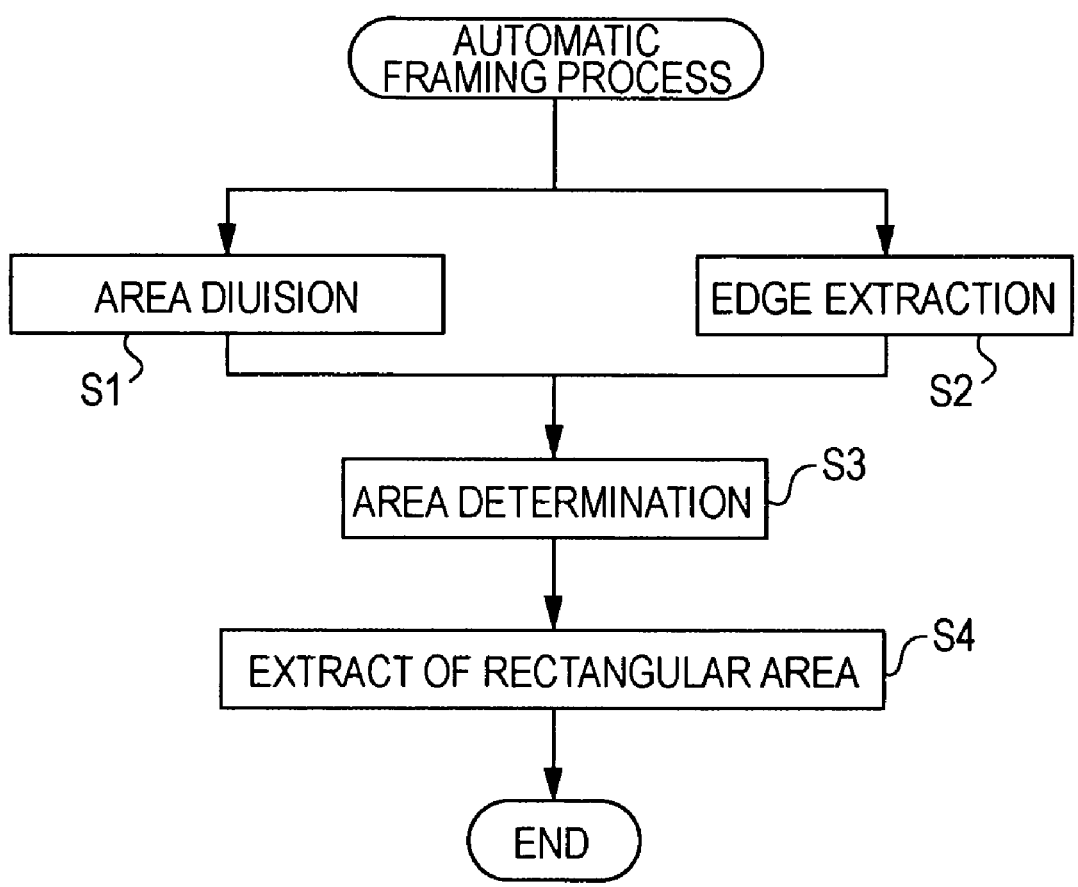
FIG. 2 is a flowchart showing a process of realizing automatic framing according to an embodiment of the present invention.

FIG. 2 is a flowchart showing a process of realizing the automatic framing according to an embodiment of the present invention. This process is realized, for example, by the CPU 107 that executes the program code read from the ROM 109.

Figure 3:
FIG. 3 shows an example of an input image used in the automatic framing.
Figure 4:
FIG. 4 shows an example of the image after the input image shown in FIG. 3 is subjected to area division.
Figure 5:
FIG. 5 shows an example of an edge image corresponding to the input image shown in FIG. 3.

After an image to be processed is input, in Step S1, the process performs area division to divide the input image into image areas. In Step S2, the process performs edge extraction to extract an edge image, in parallel with Step S1. FIG. 3 shows an example of the input image. FIG. 4 shows an example of the image after the area division. FIG. 5 shows an example of the edge image.

The area division of an image can be performed by integrating polygonal meshes each including a pixel or multiple pixels by so-called mesh segmentation. The mesh segmentation is basically based on the similarity between adjacent image areas. According to the embodiment of the present invention, image areas are generated at a desired density on the basis of determination of whether adjacent image areas are to be integrated by using a statistical algorithm. The determination will be described in detail below.

The edge extraction is performed by differentiating an original image. Since known methods are applicable to the edge extraction, a detailed description of the edge extraction is omitted herein.

Referring back to FIG. 2, in Step S3, the process determines a target area having higher visibility and an unnecessary area having lower visibility from the image areas after the area division.

Face detection can be used as one method of extracting the target area. In the face detection, a face area is detected from an input image and the detected face area is processed as the target area.

The determination of whether an extracted area is the target area may be based on the orientation of the face in the detected face area. If two or more faces area included in the detected area, the visibility may be weighted on the basis of whether the subject faces the front or looks away from the camera. In addition, personal identification may be applied to the extracted face area to weight the visibility on the basis of the human relationship between the persons (for example, on the basis of the positions of the persons in an organization or whether the persons have leading or supporting roles in an event).

In order to embody the face detection or face recognition, a method of using a neutral network or a method (eigenspace method) of applying principal component analysis (PCA) to a vector space having the luminances of face images as elements can be adopted. A method of recognizing faces (for example, refer to WO2003/019475) may be adopted. In this method, after extracting a face area by using a Gabor filter that uses multiple filters having directional selectivity and different frequencies to filter images, the extraction result of the face area is input in a support vector machine to map images of the face area in a nonlinear space and a separating hyperplane is yielded in this nonlinear space in order to discriminate between face images and non-face images.

In addition, a method may be adopted, in which matching between an input image and information concerning a target object, which is not limited to a person and which is set in advance to be included in the target area, is performed to determine an area having higher degrees of matching to be the target area.

Furthermore, an area having higher attractiveness may be determined to be the target area. The attractiveness is evaluated on the basis of a physical characteristic, such as the color, shape, area (the ratio in area of each object to an input image), or texture of each object included in the input image. For example, a method of evaluating the attractiveness of image areas on the basis of physical characteristics of the image areas is described in Soto T. "Gazo Ryouiki no Butsuri-teki Tokuchou ni Motozuku Yuumoku-do Hyouka Moderu", IEICE transactions A, Vol. J83-A, No. 5 (May, 2000), pp. 576-588.

Furthermore, a degree of focusing may be yielded for every extracted image area to determine a target area and an unnecessary area on the basis of the degree of focusing.

According to the embodiment of the present invention, "an amount of edge" is used as a value indicating the degree of focusing. The amount of edge means a value given by calculating the sum of the pixel values in the edge image extracted in Step S2 for every image area divided in Step S1 and normalizing the sum of the pixel values with the length or area of the edge.

Figure 6:
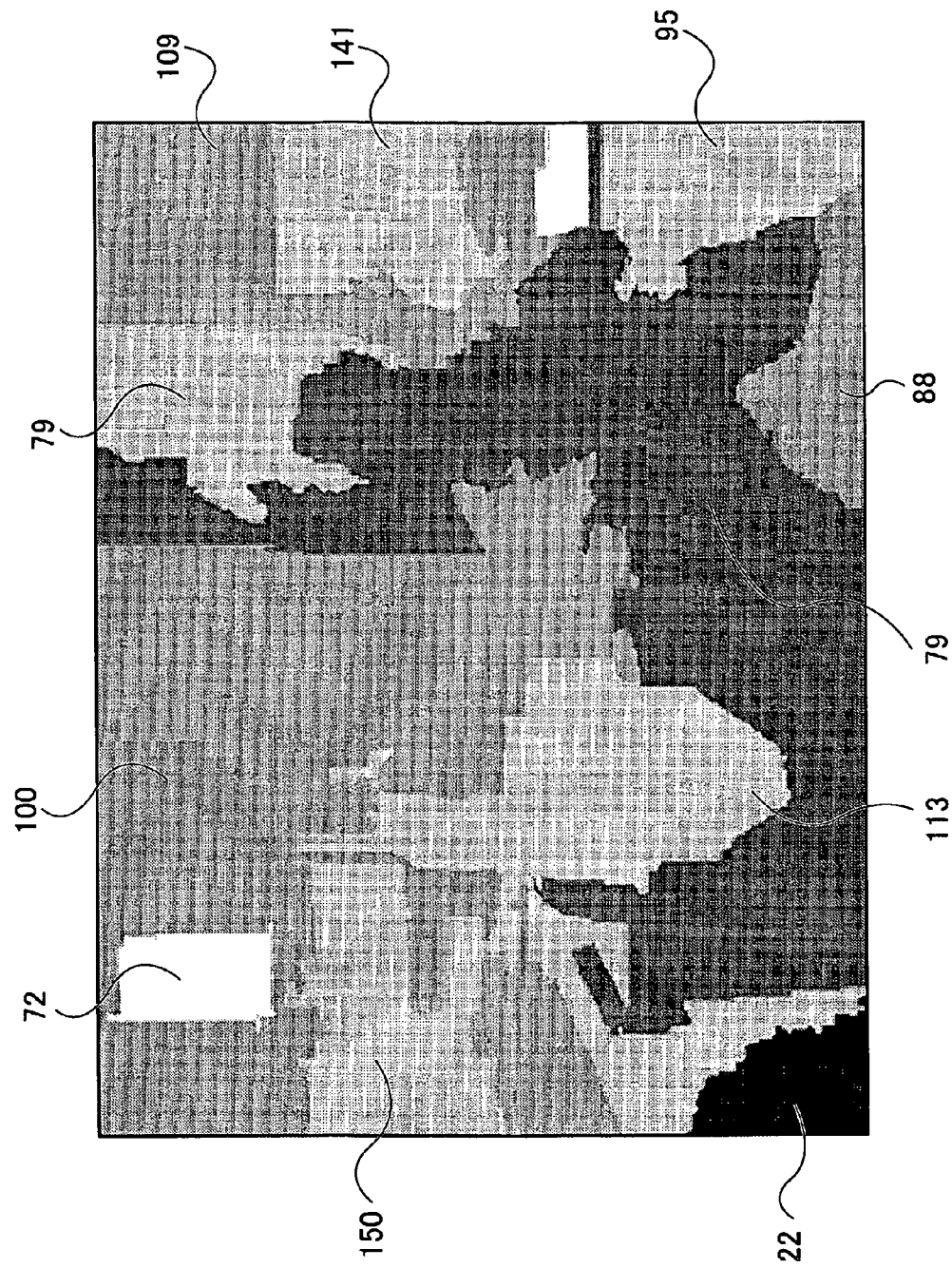
FIG. 6 shows the amounts of edge calculated for image areas in the image shown in FIG. 4.

An image area having a greater amount of edge is assumed as the target area and an image area (particularly, a peripheral area in the image) having a smaller amount of edge is assumed as the unnecessary area. FIG. 6 shows examples of the amounts of edge calculated for the image areas in the input image shown in FIG. 3, by using the image after the area division shown in FIG. 4 and the edge image shown in FIG. 5.

Instead of automatically determining the target area and the unnecessary area from the image areas in the manner described above, a user may directly point the target area and the unnecessary area with the touch panel in the image after the area division shown in FIG. 4, displayed in the display unit 111. For example, the user may visually recognize a captured image and may point an unnecessary object, such as a finger of the user or the strap of the camera.

Referring back to FIG. 2, in Step S4, the process extracts a maximum rectangular area that does not include the unnecessary area and has a predetermined aspect ratio and, then, terminates the automatic framing.

Figure 7:
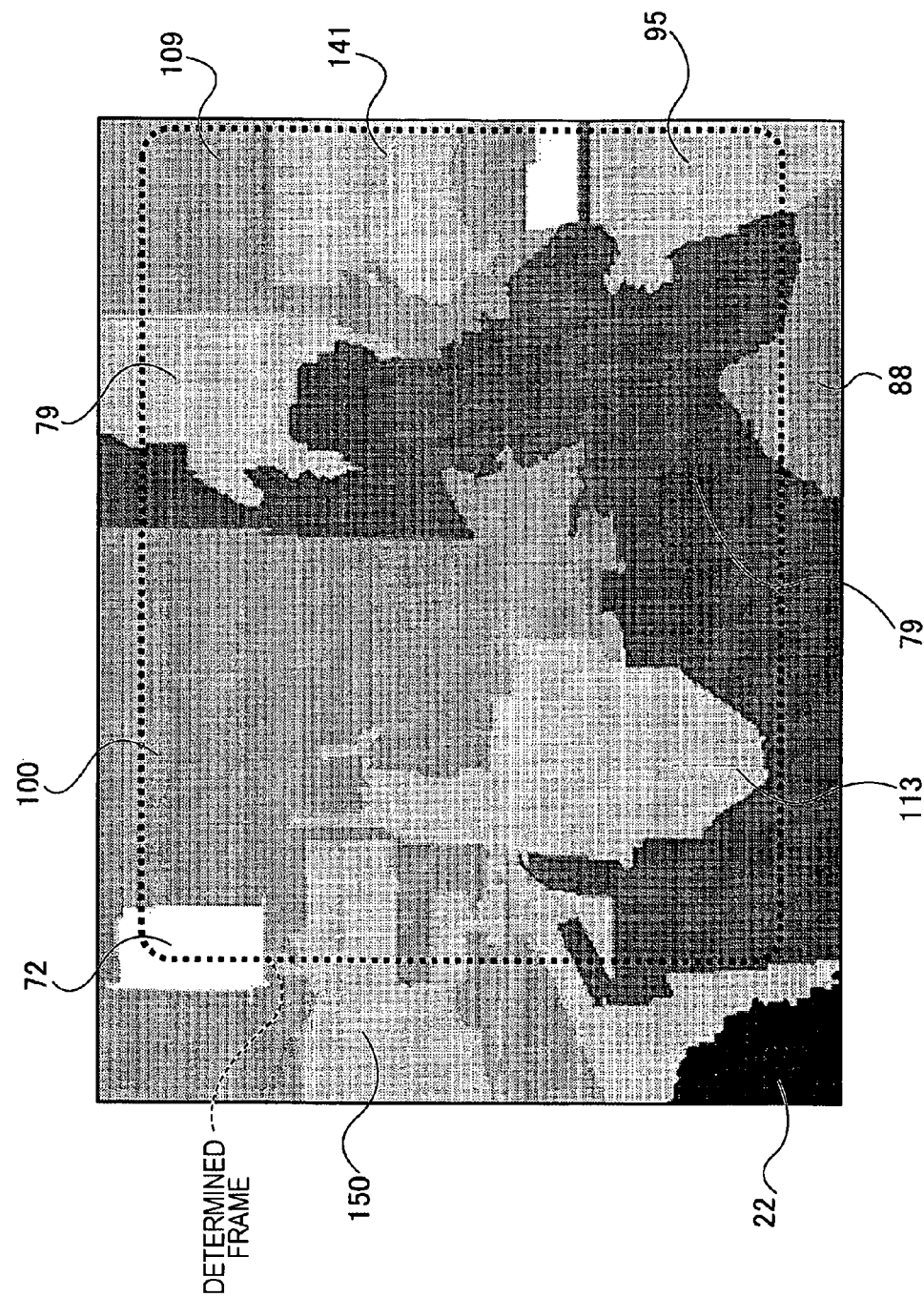
FIG. 7 shows how to set a composition in the image divided into the areas, shown in FIG. 6.
Figure 8:
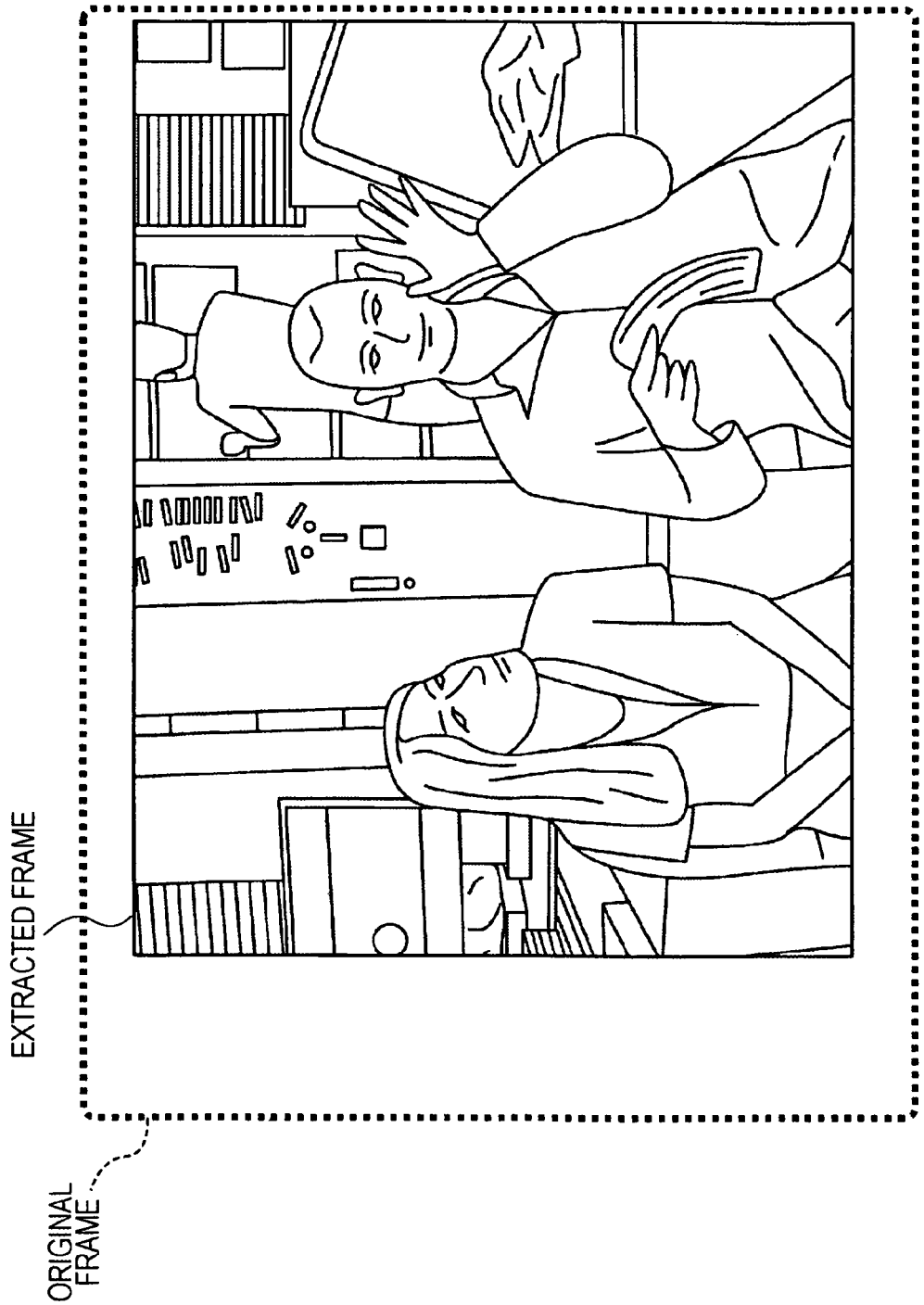
FIG. 8 shows a frame extracted from the captured image in accordance with the composition shown in FIG. 7.

In the example of the input image shown in FIG. 3, an out-of-focus image of a finger of the user, which is carelessly put on the shooting lens, is shown in the lower left part of the image. The finger is extracted as an image area, in addition to the persons being the subjects and the background, in the image after the area division shown in FIG. 4. The edge of the finger is extracted, in addition to the persons being the subjects and the background, in the edge image after the edge extraction shown in FIG. 5. However, the finger area has a smaller amount of edge than other image areas, as shown in FIG. 6, because the out-of-focus image of the finger does not have sharp edge. As a result, the finger is determined to be an unnecessary area and a maximum rectangular area that does not include the finger area and has a predetermined aspect ratio is output as a final frame. FIG. 7 shows how to set a composition in the image divided into the areas. FIG. 8 shows a frame extracted from the original captured image by the automatic framing.

The area division of the image, in Step S1 in FIG. 2, will now be described in detail.

The image areas can be processed as a collection of many polygons. The integration and division of the image areas is also called "mesh segmentation". Since the density of the polygonal mesh greatly affects the processing load or the image quality, the mesh segmentation suitable for an application can be performed in, for example, computer graphics to appropriately adjust the density of the polygonal mesh.

The mesh segmentation is basically based on the similarity between adjacent image areas. However, since region growing or hierarchical/iterative/spectral clustering is mainly performed by repetitive operation using an array in the mesh segmentation in related art, the processing speed is undesirably slow.

In contrast, according to the embodiment of the present invention, the image areas are generated at a desired density on the basis of determination of whether adjacent image areas are to be integrated by using a statistical algorithm. In this statistical algorithm, it is determined whether adjacent image areas are similar, that is, whether adjacent image areas are to be integrated on the basis of a predicate derived from concentration inequality in the areas of polygons included in the image areas.

The integration of the image areas on the basis of the statistical algorithm can be performed at high speed because the integration is performed by simple calculation in which image attribute information about adjacent image areas is statistically processed. For example, in the case of information concerning a three-dimensional image whose image areas are polygonal meshes, pixel attribute information, such as the area, normal direction, or color information, concerning the image areas is statistically processed. In the case of video information including multiple color components, such as RGB, the integration is performed for every color component on the basis of a predicate derived from the concentration inequality.

In the integration of the image areas on the basis of such a statistical algorithm, a common computational machine, such as a personal computer, can be used to process about a million polygons per second. The integration can be implemented in a built-in device, such as a digital camera, depending on the pixel size. In addition, adjustment of the value of the parameter included in the predicate allows a criterion for integrating the image areas to be appropriately set to generate polygonal meshes at a desired density, thus providing scalability.

Objects to be drawn are generally processed as a collection of polygons in image processing, such as three-dimensional computer graphics, and the polygonal mesh being the image area can be represented in the form of an incidence graph in which the relationship between multiple polygons, which are components, is described. In the mesh segmentation according to the embodiment of the present invention, each polygon, which is the minimal unit of the polygonal mesh, is processed as one node in the incidence graph. Adjacent polygonal nodes in the polygonal mesh are connected via edges corresponding to sides sandwiched between the adjacent nodes to describe the incidence graph, and the described incidence graph is input in the mesh segmentation.

A method of drawing the incidence graph when the image area being the polygonal mesh is processed will now be described.

First, each polygon $T_i$ in the image area to be processed is associated with a node $N_i$. If only one side belonging to both polygons $T_i$ and $T_j$ exists between the node $N_i$ and a node $N_j$, an edge $e_{ij}$ is generated between the node $N_i$ and the node $N_j$.

The incidence graph can be directly drawn from an index array including vertexes and planes by sorting the polygons with respect to the endpoints of the edges. The sides or edges of each polygon are divided into boundary edges, which are boundaries of the polygonal mesh or image area, and interior edges, which are not boundaries of the polygonal mesh but touch other adjacent polygons in the polygonal mesh. Since the edge that is a boundary of the image area belongs to only one polygon, only edges other than the boundary edges (i.e., only the interior edges of the image area) are to be processed. It is sufficient to provide an index array including vertexes and planes and there is no need to provide a complicated adjacent data structure, such as a half-edge structure or a guad-edge structure.

Figure 9:
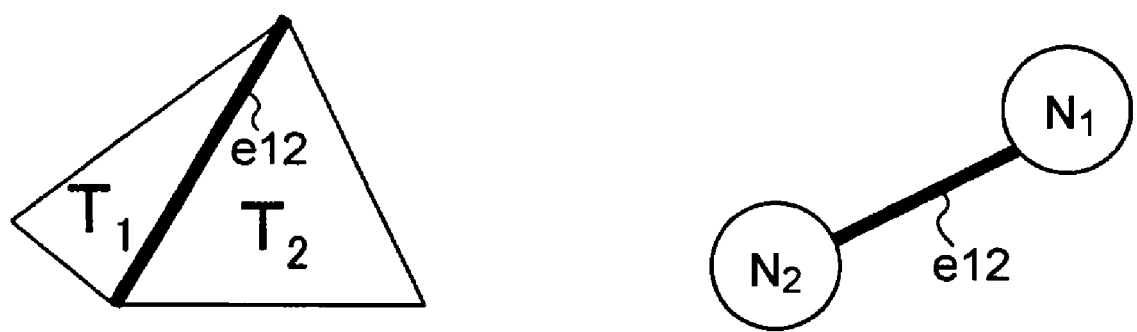
FIG. 9 shows an example of a simplest incidence graph.

FIG. 9 shows an example of a simplest incidence graph. A polygonal mesh shown on the left of FIG. 9 includes two triangles $T_1$ and $T_2$ that are connected to each other via a side or edge $e_{12}$. The incidence graph describing this polygonal mesh includes two nodes $N_1$ and $N_2$ corresponding to the triangles $T_1$ and $T_2$ and an edge $e_{12}$ touching the node $N_1$ and the node $N_2$, as shown on the right of FIG. 9.

Figure 10:
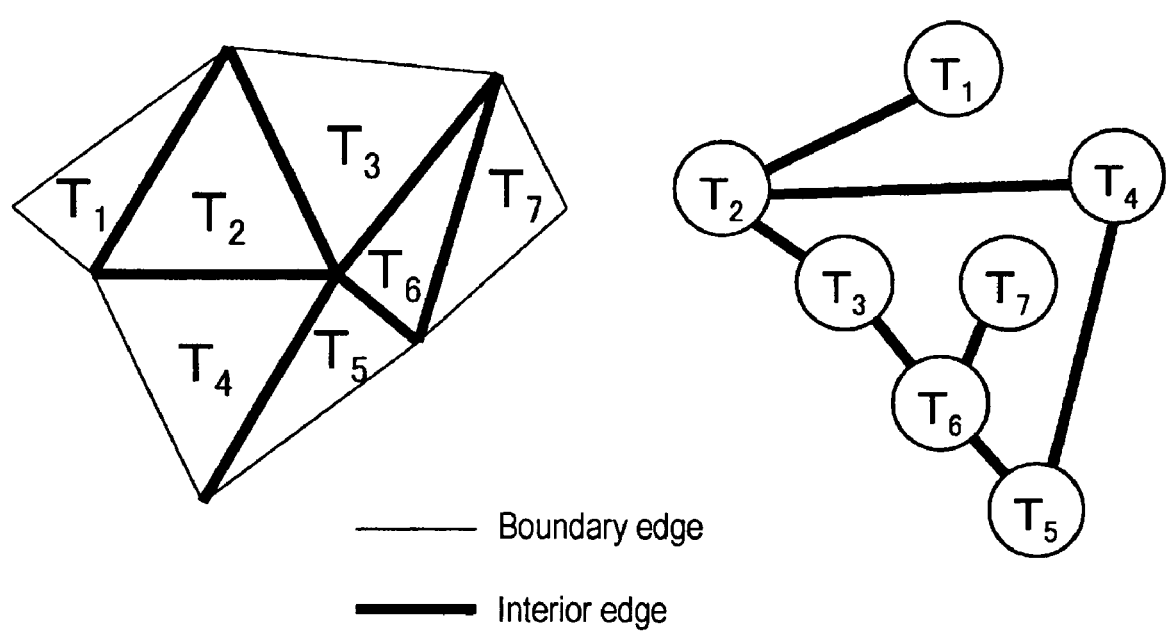
FIG. 10 shows an example of a more complicated incidence graph.

FIG. 10 shows an example of a more complicated incidence graph. A polygonal mesh shown on the left of FIG. 10 includes seven triangles $T_1$ to $T_7$. The triangle $T_1$ touches the triangle $T_2$; the triangle $T_2$ touches the triangles $T_1$, $T_3$, and $T_4$; the triangle $T_3$ touches the triangles $T_2$ and $T_6$; the triangle $T_4$ touches the triangles $T_2$ and $T_5$; the triangle $T_5$ touches triangles $T_4$ and $T_6$; and the triangle $T_6$ touches the triangles $T_3$, $T_5$, and $T_7$. In the incidence graph describing the polygonal mesh, the nodes corresponding to the triangles are connected via the sides or edges that touch adjacent triangles, as shown on the right of FIG. 10.

The node is a polygon, which is a minimum unit of the polygonal mesh, in the initial state but grows into an image area, which is a polygonal mesh grown from one polygon, during progress of the mesh growing. Identification information $id(N_i)$ for uniquely identifying each node $N_i$, an area $area(N_i)$ of the image area (initially, one polygon) corresponding to the node $N_i$, and the number $n(N_i)$ (the initial value is equal to one) of polygons included in the image area or polygonal mesh are held as "node statistical information". Each node holds the area and the number of polygons because the area and the number of polygons are necessary to determinate whether the nodes or image areas are to be integrated by using a predicate based on a statistical algorithm.

Next, each edge in the input incidence graph is evaluated for sorting. Specifically, in the evaluation of each edge, the attribute values of the image areas connected via the edge are compared with each other to give weight values to the edges on the basis of the comparison result and the edges in the incidence graph are sorted on the basis of the weight values. The image area here includes the polygon, which is a minimum unit, and the image area, which is a polygonal mesh in which multiple polygons are integrated.

For example, the area of the image area is used as the attribute value. A difference in the area between the image areas connected via the edge is given as the weight value of the edge and the edges are sorted in the ascending order of the weight values. In this case, the weight value is decreased and the processing order is raised in the subsequent integration process as the difference in the area between the image areas becomes smaller.

Figure 11:
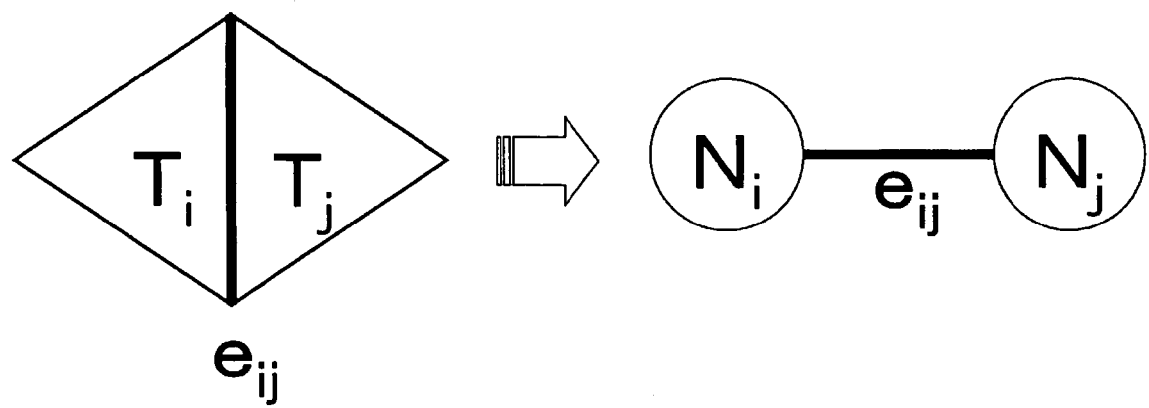
FIG. 11 illustrates how to evaluate an edge.

FIG. 11 illustrates how to evaluate an edge. Referring to FIG. 11, a polygonal mesh shown on the left of FIG. 11 has two triangles $T_i$ and $T_j$ that are connected via an edge $e_{ij}$. The incidence graph describing this polygonal mesh includes two nodes $N_i$ and $N_j$ corresponding to the triangles $T_i$ and $T_j$ and an edge $e_{ij}$ touching the node $N_i$ and the node $N_j$, as shown on the right of FIG. 11. A weight value $W(e_{ij})$ of the edge $e_{ij}$ is calculated according to Formula 1 where area(P) denotes a function for calculating the area of a polygon P.

[Formula 1]

$$W(e_{ij}) = |area(T_i) - area(T_j)| \qquad (1)$$

Alternatively, in addition to the areas of the polygons in the image area, differences in various attribute values between adjacent vertexes may be used to set the weight values of the edges. The attribute values include the pixel attribute information, such as the normal direction or color of the image area (in the case of the polygonal mesh having a texture).

Figure 12:
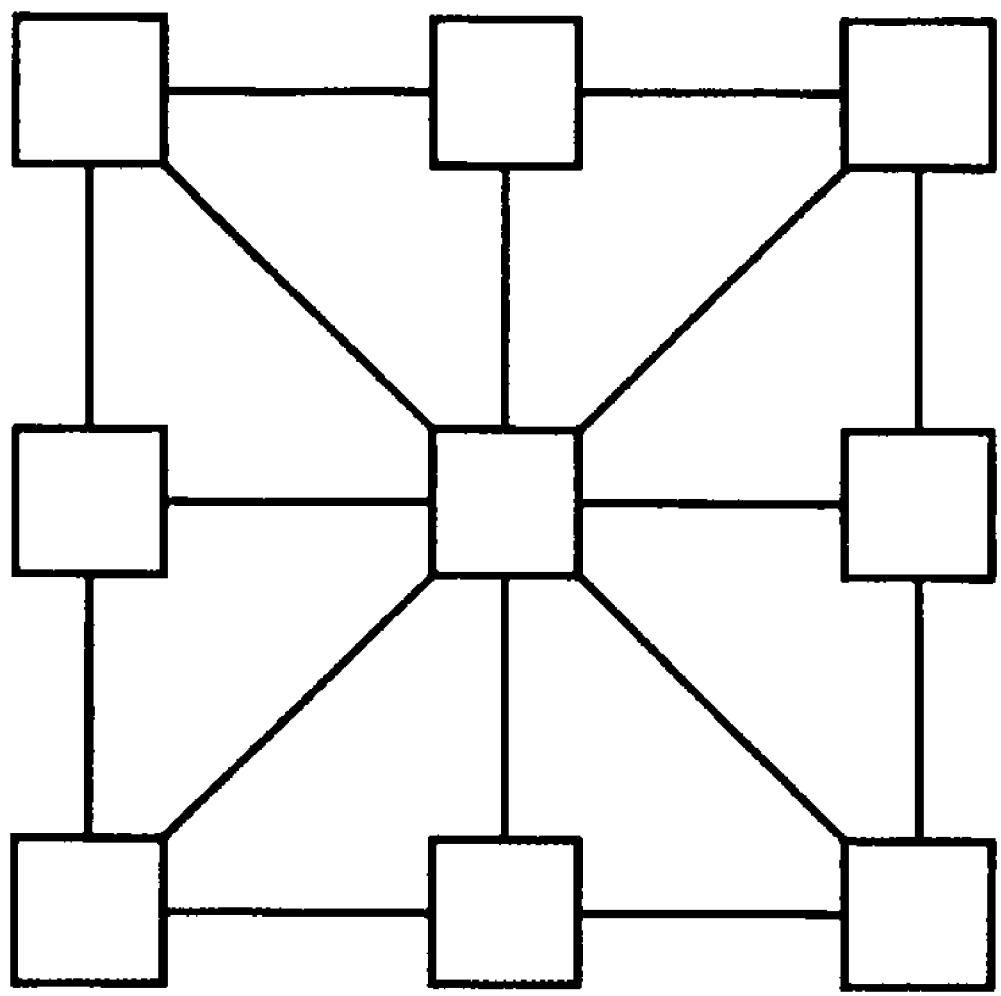
FIG. 12 illustrates how to draw an incidence graph of video information.

In the case of video information, such as an image captured by a digital camera, the initial incidence graph is represented by the connection relationship not between polygons but between pixels. FIG. 12 illustrates how to draw the incidence graph of video information. In the initial state, each pixel is processed as a node and the edges are defined between a target pixel and eight surrounding pixels, as shown in FIG. 12. The parameters available in the evaluation of the edges are limited to, for example, the area and the normal line in the case of the polygonal mesh, whereas it is possible to optimize the method of evaluating the edge, or the method of calculating the weight value in the case of the video information because the video information has many available parameters. According to the embodiment of the present invention, differences in the average pixel value for every RGB color between the pixels (or the image areas) connected via the edge are calculated and the maximum value among the differences is given to the edge as the weight value. Then, the edges in the incidence graph are sorted on the basis of the weight values, in the manner described above.

Next, a pair of the image areas sandwiching the edge is extracted in the order of the sorting and the mesh growing is performed for the extracted pair. Since the weight value, which serves as an index of the similarity between the image areas connected via the edge, is given to the edge, the mesh growing in the ascending order of the weight values corresponds to the mesh growing in which higher priority is given to the image area having higher similarity.

In the generation of the incidence graph described here, it is determined whether the two image areas connected via the edge extracted in the order of sorting are to be integrated on the basis of a statistical algorithm. Specifically, it is determined that image areas $R_k$ and $R_l$ are to be integrated if a predicate on the basis of the following statistical algorithm is satisfied for the two image areas $R_k$ and $R_l$ connected via the edge.

Formula 2 shows an example of a predicate applicable to the image area, which is a polygonal mesh, such as a three-dimensional computer graphic. In Formula 2, the image area $R_k$ has an area $S_k$ and includes an $n_k$ number of polygons, and the image area $R_l$ has an area $S_l$ and includes an $n_l$ number of polygons. In Formula 2, A denotes a maximum area of the polygon and Q denotes a parameter used for controlling the segmentation density.

[Formula 2]

$$\left|\frac{S_k}{n_k} - \frac{S_l}{n_l}\right|^2 \le \frac{A^2(n_k \log n_k + n_l \log n_l)}{Q}\left(\frac{1}{n_k} + \frac{1}{n_l}\right) \qquad (2)$$

According to Formula 2, the mesh growing is performed if a difference $(S_k/n_k - S_l/n_l)$ in the average area of the polygons included in each image area between the image areas connected via the edge has a smaller value. The predicate is derived from the concentration inequality, which is a phenomenon appearing in the areas of the polygons included in the image area. In the field of statistics, the concentration inequality is common as a central limit theorem (the distribution of the sample average converges into normal distribution when the size of the sample extracted from a parent population is increased even if the parent population has an arbitrary distribution).

In contrast, when the video information is processed instead of the polygonal mesh, the predicate based on the concentration inequality can be optimized because the video information has many parameters. For example, the mesh growing is performed if a difference in the average pixel value of the pixels included in each image area, calculated between the image areas connected via the edge for every RGB color component, has a smaller value.

"Q" in the right side of Formula 2 denotes a parameter used for controlling the segmentation density. The value of the right side is decreased as "Q" is increased and it becomes difficult to satisfy the predicate to suppress the mesh growing of the image areas. Conversely, the value of the right side is increased as "Q" is decreased and it becomes easy to satisfy the predicate to encourage the mesh growing of the image areas. Accordingly, the mesh segmentation results in a lower density.

In the case of image information, such as a three-dimensional computer graphic, the node is a polygon, which is a minimum unit of the polygonal mesh, in the initial state but grows into an image area, which is a polygonal mesh grown from one polygon, during progress of the mesh growing. A record is provided in which identification information $id(N_i)$ for uniquely identifying each node $N_i$, an area area($N_i$) of the image area (initially, one polygon) corresponding to the node $N_i$, and the number $n(N_i)$ (the initial value is equal to one) of polygons included in the image area or polygonal mesh are held as the "node statistical information". An image area integration processor sets new identification information for identifying a new node when the new node is integrated with the existing node and calculates the area and the number of polygons in an image area resulting from the integration to update the node statistical information.

Finally, minute areas resulting from the integration of the image areas are processed. For example, a minute polygonal mesh remaining between or inside large image areas after the mesh growing is integrated with any adjacent image area, regardless of whether the predicate is satisfied, to improve the appearance of the processing result. The minute area corresponds to a polygonal mesh having an area of only about a few percent of that of the mesh plane.

Figure 13:
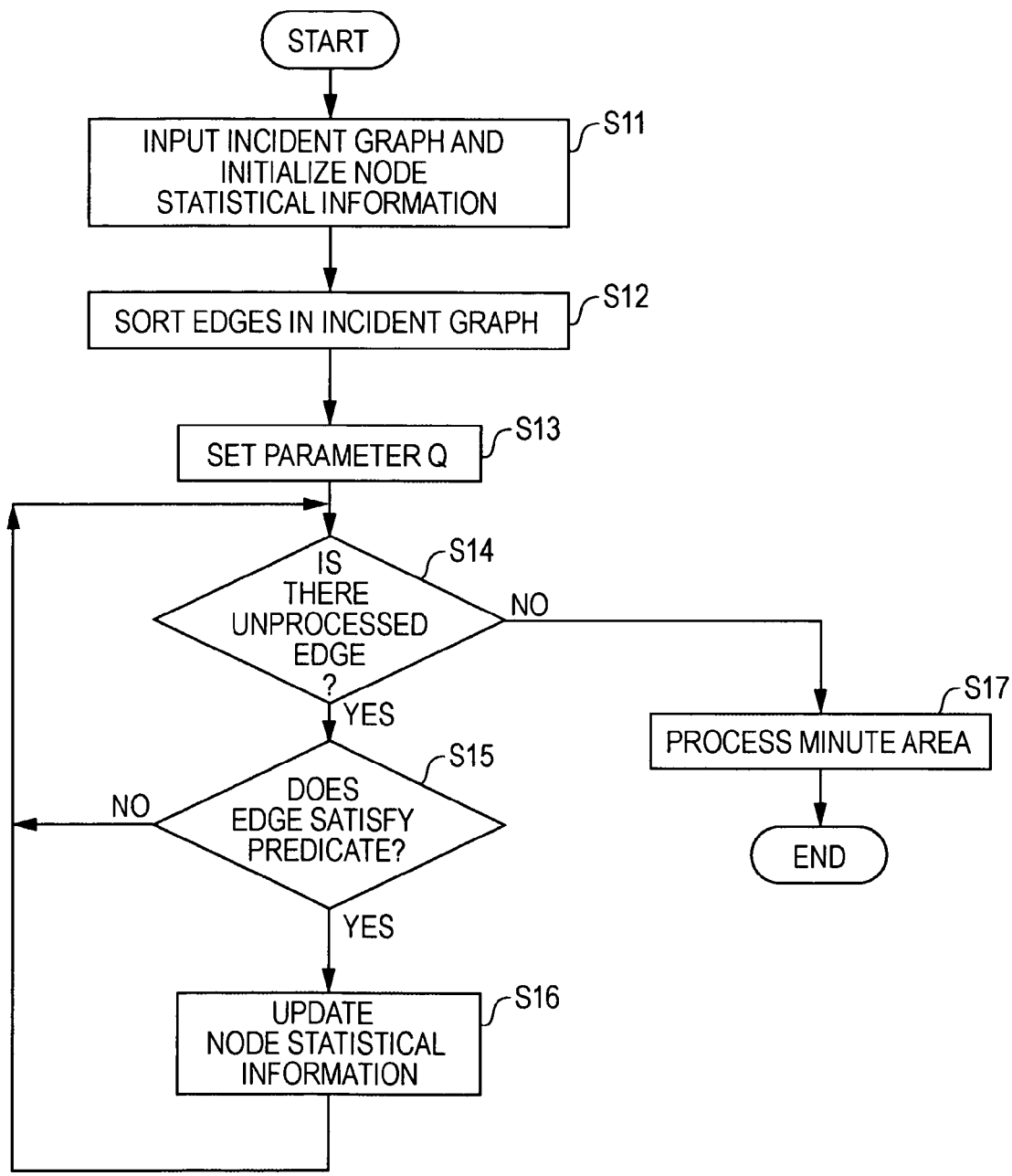
FIG. 13 is a flowchart showing an example of a mesh segmentation process.
Figure 14:
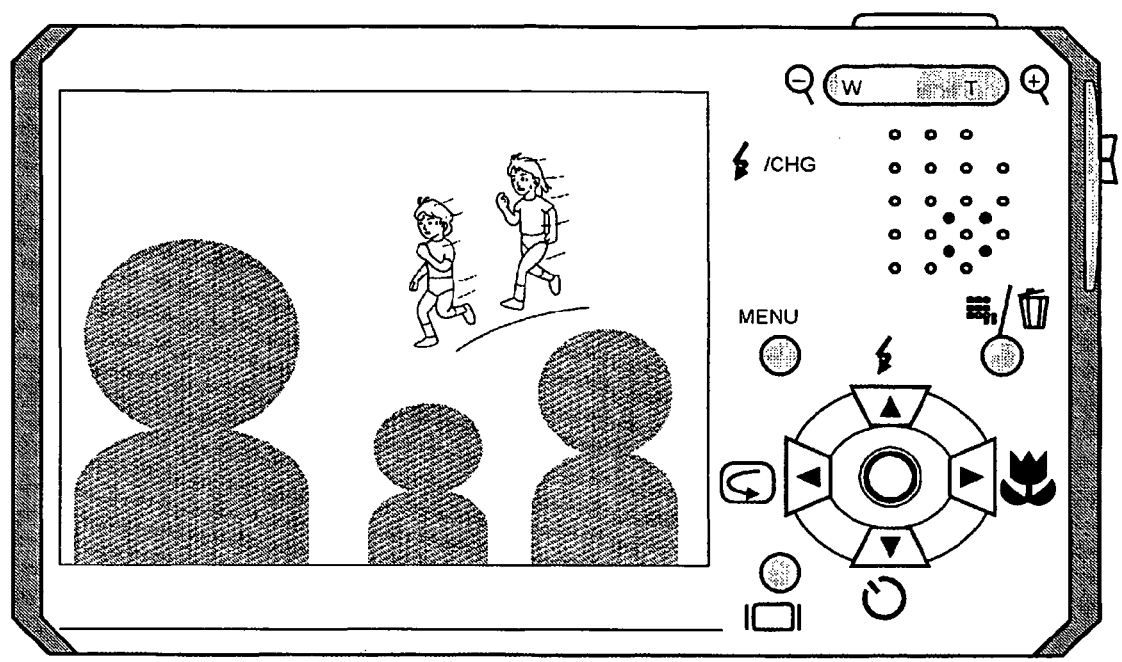
FIG. 14 shows an image recognized through a liquid crystal finder, when desired subjects are obstructed by shadows of persons in front of a user.
Figure 15:
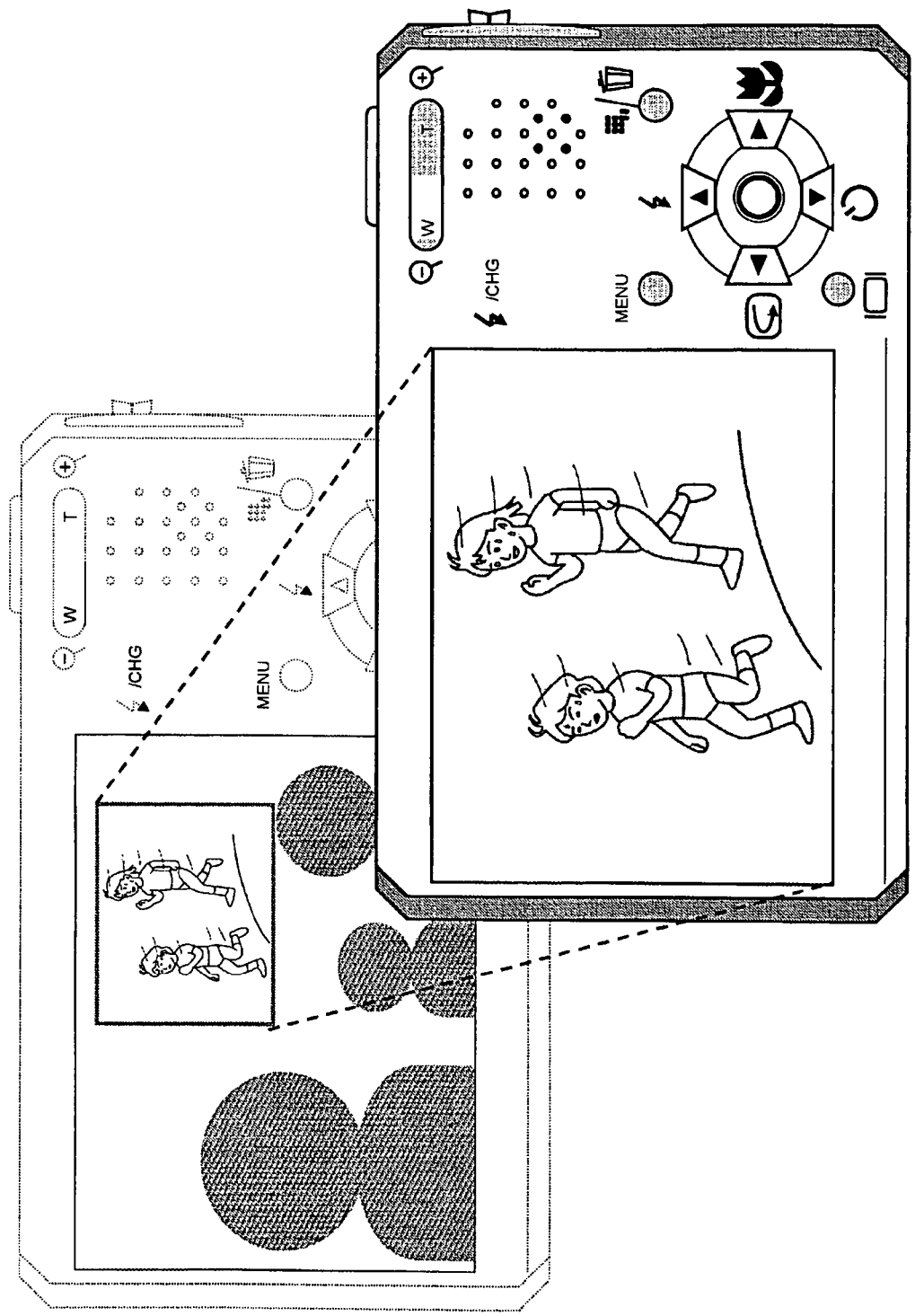
FIG. 15 shows a maximum rectangular area determined as a composition, the rectangular area not including unnecessary areas, such as shadows of persons, and having a predetermined aspect ratio.

FIG. 13 is a flowchart showing an example of a mesh segmentation process.

In Step S11, the process receives image information concerning a three-dimensional object to be processed. According to the embodiment of the present invention, the image information is described in the form of an incidence graph including polygons as nodes and sides of each polygon as edges (refer to the above description and FIG. 9).

The input incidence graph is scanned to give the identification information $id(N_i)$ to each node $N_i$, and the area of the polygon corresponding to the node is calculated. The identification information, the area, and the number polygons (the initial value is equal to one) for every node are registered as the node statistical information (initialized). Pseudo program code used for initializing the node statistical information is shown in Formula 3, where id( ) denotes an array in which identification information concerning a node, indicated as an argument, is stored; area( ) denotes an array in which the area of the node having the identification information indicated as the argument is stored; and n( ) denotes an array in which the number of polygons included in the node having the identification information indicated as the argument is stored.

[Formula 3]

$id(N_i)=i$ area($i$)=area($T_i$)

$n(i)=1$ \hfill (3)

In Formula 3, "i" is assigned to the identification information $id(N_i)$ concerning the i-th extracted node $N_i$ from the incidence graph, an area area($T_i$) of the polygon corresponding to the node is assigned to the area area(i) of the node $N_i$, and the initial value one is assigned to the number n(i) of polygons.

Referring back to FIG. 13, in Step S12, the process evaluates each edge in the input incidence graph to perform the sorting. Specifically, a difference in the area between the image areas connected via the edge is given as the weight value of the edge and the sorting is performed in the ascending order of the weight values. The weight value is decreased and the processing order is raised in the subsequent integration process as the difference in the area between the image areas becomes smaller.

In Step S13, the process sets a parameter Q used for controlling the segmentation density.

In the integration of the image areas, a pair of the image areas sandwiching the edge is extracted in the order of the sorting. In Step S14, the process determines whether there is an unprocessed edge. If the process determines that there is an unprocessed edge, then in Step S15, the process determines whether the image areas satisfy a predicate based on a statistical algorithm. The predicate used in Step S15 is derived from the concentration inequality, which is a phenomenon appearing in the areas of the polygons included in the image area, as described above, and the parameter Q set in Step S13 is used here.

As described above, a record is provided in which the identification information $id(N_i)$ for uniquely identifying each node $N_i$, the area area($N_i$) of the image area (initially, one polygon) corresponding to the node $N_i$, and the number $n(N_i)$ (the initial value is equal to one) of polygons included in the image area or polygonal mesh are held as the "node statistical information". In the integration of the image areas, a new node is generated and new identification information for identifying the new node is given to the generated node when the image areas are integrated with each other, and the area of the new image area resulting from the integration and the number of polygons in the new image area are calculated to update the node statistical information in Step S16.

Pseudo program code used for integrating the image areas and, then, updating the node statistical information is shown in Formula 4, where Merge( ) denotes a function of integrating image areas indicated as arguments.

[Formula 4]

$Merge(N_i, N_j)$ $id'(N_i) = id'(N_j)$ $area(id'(N_i)) = area(id(N_i)) + area(id(N_j))$ $n(id'(N_i)) = n(id(N_i)) + n(id(N_j))$ $id(N_i) \leftarrow id'(N_i)$ $id(N_j) \leftarrow id'(N_j)$ (4)

In Formula 4, a node $N_i$ is integrated with a node $N_j$. The nodes $N_i$ and $N_j$ are indicated as arguments of the Merge function. Next, the same new identification information $id'(N_i) = id'(N_j)$ is given to the nodes $N_i$ and $N_j$ to indicate that the two image areas are integrated and a new node is generated. According to the embodiment of the present invention, the old identification information concerning the node $N_i$ or $N_j$ is used as the identification information concerning the new node. A Union-Find algorithm invented by Robert Endre Tarjan may be used to give the identification information to the new node.

Next, the sum of the areas of the original image areas, area($N_i$)+area($N_j$), is assigned to an area area($id'(N_i)$) of the new node, and the sum of the numbers of polygons in the original image areas, $n(id(N_i))+n(id(N_j))$ is assigned to the number $n(id'(N_i))$ of polygons in the new node. Finally, the new identification information $id'(N_i)$ is given to the original node $N_i$ and the new identification information $id'(N_j)$ is given to the original node $N_j$ to terminate the update of the node statistical information.

Referring back to FIG. 13, if the process determines in Step S14 that all the edges in the incidence graph are processed, then in Step S17, the process processes minute areas remaining after the integration of the image areas. For example, a minute polygonal mesh remaining after the integration between or inside large image areas is integrated with any adjacent image area, regardless of whether the predicate is satisfied, to improve the appearance of the processing result. The minute area means a polygonal mesh having an area of only about a few percent of that of the entire mesh plane.

The integration of the image areas on the basis of the statistical algorithm can be performed at high speed because the integration is performed by simple calculation in which the areas of the polygons are statistically processed. For example, a common computational machine can be used to process about a million polygons per second. The area division can be performed to the image areas not only in the computer system, such as a personal computer, but also in a portable device, such as a digital camera, whose computing power is restricted, and it is possible to realize the automatic framing according to the process shown in FIG. 2. In addition, adjustment of the parameter Q included in the predicate allows a criterion for integrating the image areas to be appropriately set to generate polygonal meshes at a desired density, thus providing scalability.

Applications of the mesh segmentation include parameterization and texture mapping, morphing, multiresolution modeling, image editing, image compression, animation, and shape matching. The integration of the image areas on the basis of a statistical algorithm is described in detail in, for example, Japanese Patent Application No. 2005-166466 already assigned to the assignee.

Although the automatic framing function mounted in the digital camera is described in the above embodiments in this specification, the present invention is not limited to the above embodiments. The present invention is applicable to a personal computer or any other image processing apparatus which stores and processes captured images.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus automatically determining a composition of an input image, the image processing apparatus comprising:
   area dividing means for dividing the input image into image areas;
   target area determining means for determining a target area having a predetermined target area characteristic or characteristics distinct from the divided image;
   unnecessary area determining means for determining an unnecessary area having a predetermined unnecessary area characteristic or characteristics distinct from the divided image; and
   composition determining means for determining from the input image a composition that includes the target area and does not include the unnecessary area,
   wherein the area dividing means assigns a weight value to an edge shared by a first image area and a second image area based on a result of comparison between average pixel values of pixels of the image areas, the weight value being a maximum value among differences in the average pixel values of every red, green, and blue color (RGB color) between the first and second image areas.

2. The image processing apparatus according to claim 1, wherein the target area determining means performs face detection to the input image to determine the target area on the basis of an area where a face is detected.

3. The image processing apparatus according to claim 1, further comprising target object information holding means for holding information concerning a target object,
wherein the target area determining means performs matching between the input image and the information concerning the target object to determine an area having a higher degree of matching to be the target area.

4. The image processing apparatus according to claim wherein the target area is evaluated from a physical characteristic or characteristics, chosen from a group of a color, a shape, an area (a ratio in area of each object to the input image), and a texture, of each object included in the input image.

5. The image processing apparatus according to claim 1, wherein the target area determining means and the unnecessary area determining means determine the target area and the unnecessary area, respectively, on the basis of a degree of focusing yielded for every area.

6. The image processing apparatus according to claim 1, further comprising:
edge image extracting means for extracting an edge of each divided image area in the input image; and
amount-of-edge calculating means for calculating a sum of pixel values in the extracted edge for every divided image area to yield an amount of edge resulting from normalization of the sum of the pixel values with a length or an area of the extracted edge as a value indicating a degree of focusing.

7. The image processing apparatus according to claim 6, wherein the unnecessary area determining means determines a peripheral area having a smaller amount of edge in the input image to be the unnecessary area.

8. The image processing apparatus according to claim 1, further comprising:
image display means for displaying the input image and the image divided into the areas by the area dividing means; and
user input means for receiving a manual selection input by a user on the displayed divided image,
wherein at least one of the target area and the unnecessary area is determined in accordance with the manual selection by the user.

9. The image processing apparatus according to claim 1, wherein the composition determining means determines a maximum rectangular area in the input image, which area does not include the unnecessary area and has a predetermined aspect ratio, to be the composition.

10. The image processing apparatus according to claim 1, wherein the area dividing means:
sorts edges of the image areas in a sorting order based on weight values assigned to the edges; and
determines whether the first and second image areas sharing the edge are to be integrated on the basis of a statistical algorithm in the sorting order.

11. The image processing apparatus according to claim 10, wherein the area dividing means sorts the edges in ascending order of the weight values.

12. The image processing apparatus according to claim 10, wherein the area dividing means determines whether the image areas connected via the edges are to be integrated on the basis of a predicate derived from concentration inequality in areas of polygons included in the image areas.

13. An image processing method implemented by a central processing unit automatically determining a composition of an input image, the image processing method comprising the steps of:
dividing, using a processor, the input image into image areas;
assigning, using the processor, a weight value to an edge shared by a first image area and a second image area based on a result of comparison between average pixel values of pixels of the image areas, the weight value being a maximum value among differences in the average pixel values of every red, green, and blue color (RGB color) between the first and second image areas;
determining, using the processor, a target area having a predetermined target area characteristic or characteristics distinct from the divided input image;
determining, using the processor, an unnecessary area having a predetermined unnecessary area characteristic or characteristics distinct from the divided image; and
determining, using the processor, from the input image a composition that includes the target area and does not include the unnecessary area.

14. The image processing method according to claim 13, wherein determining the target area comprises performing face detection to the input image to determine the target area on the basis of an area where a face is detected.

15. The image processing method according to claim 13, further comprising the step of acquiring information concerning a target object,
wherein determining the target area comprises performing matching between the input image and the information concerning the target object to determine an area having a higher degree of matching to be the target area.

16. The image processing method according to claim 13, wherein the target area is evaluated from a physical characteristic or characteristics, chosen from a group of a color, a shape, an area (a ratio in area of each object to the input image), and a texture, of each object included in the input image.

17. The image processing method according to claim 13, wherein determining the target area and determining the unnecessary area comprise determining the target area and the unnecessary area, respectively, on the basis of a degree of focusing yielded for every area.

18. The image processing method according to claim 13, further comprising the steps of:
extracting an edge of each divided image area in the input image; and
calculating a sum of pixel values in the extracted edge for every divided image area to yield an amount of edge resulting from normalization of the sum of the pixel values with a length or an area of the extracted edge as a value indicating a degree of focusing.

19. The image processing method according to claim 18, wherein determining the unnecessary area comprises determining a peripheral area having a smaller amount of edge in the input image to be the unnecessary area.

20. The image processing method according to claim 13, further comprising the steps of:
displaying the input image and the divided image areas; and
receiving a manual selection input by a user on the displayed divided image areas,
wherein at least one of the target area and the unnecessary area is determined in accordance with the manual selection by the user.

21. The image processing method according to claim 13, wherein determining the composition comprises determining a maximum rectangular area in the input image, which area does not include the unnecessary area and has a predetermined aspect ratio, to be the composition.

22. The image processing method according to claim 13, wherein dividing the input image comprises:
   sorting edges in a sorting order based on weight values assigned to the edges; and
   determining whether the first and second image areas sharing the edge are to be integrated on the basis of a statistical algorithm in the sorting order.

23. The image processing method according to claim 22, wherein sorting the edges comprises sorting the edges in ascending order of the weight values.

24. The image processing method according to claim 22, wherein dividing the input image comprises determining whether the image areas connected via the edges are to be integrated on the basis of a predicate derived from concentration inequality in areas of polygons included in the image areas.

25. A non-transitory computer-readable storage medium encoded with a program causing a computer system to execute a process of automatically determining a composition of an input image, the program comprising the steps of:
   dividing, using a processor, the input image into image areas;
   assigning, using the processor, a weight value to an edge shared by a first image area and a second image area based on a result of comparison between average pixel values of pixels of the image areas, the weight value being a maximum value among differences in the average pixel values of every red, green, and blue color (RGB color) between the first and second image areas;
   determining, using the processor, a target area having a predetermined target area characteristic or characteristics distinct from the divided image;
   determining, using the processor, an unnecessary area having a predetermined unnecessary area characteristic or characteristics distinct from the divided image; and
   determining, using the processor, from the input image a composition that includes the target area and does not include the unnecessary area.

26. The image processing method according to claim 25, wherein determining the target area comprises performing face detection to the input image to determine the target area on the basis of an area where a face is detected.

27. The image processing method according to claim 25, further comprising the step of acquiring information concerning a target object,
   wherein determining the target area comprises performing matching between the input image and the information concerning the target object to determine an area having a higher degree of matching to be the target area.

28. The image processing method according to claim 25, wherein the target area is evaluated from a physical characteristic or characteristics, chosen from a group of a color, a shape, an area (a ratio in area of each object to the input image), and a texture, of each object included in the input image.

29. The image processing method according to claim 25, wherein determining the target area and determining the unnecessary area comprise determining the target area and the unnecessary area, respectively, on the basis of a degree of focusing yielded for every area.

30. An image processing apparatus automatically determining a composition of an input image, the image processing apparatus comprising:
   an area dividing unit dividing the input image into image areas;
   a target area determining unit determining a target area having a predetermined target area characteristic or characteristics distinct from the divided image;
   an unnecessary area determining unit determining an unnecessary area having a predetermined unnecessary area characteristic or characteristics distinct from the divided image; and
   a composition determining unit determining from the input image a composition that includes the target area and does not include the unnecessary area,
   wherein the area dividing unit assigns a weight value to an edge shared by a first image area and a second image area based on a result of comparison between average pixel values of pixels of the image areas, the weight value being a maximum value among differences in the average pixel values of every red, green, and blue color (RGB color) between the first and second image areas.

* * * * *